(12) United States Patent
Tonar et al.

(10) Patent No.: US 12,054,671 B2
(45) Date of Patent: Aug. 6, 2024

(54) ELECTRO-OPTIC ELEMENT WITH ADDITIVE

(71) Applicant: GENTEX CORPORATION, Zeeland, MI (US)

(72) Inventors: William L. Tonar, Holland, MI (US); Leroy J. Kloeppner, Jension, MI (US)

(73) Assignee: GENTEX CORPORATION, Zeeland, MI (US)

( * ) Notice: Subject to any disclaimer, the term of this patent is extended or adjusted under 35 U.S.C. 154(b) by 184 days.

(21) Appl. No.: 17/457,094

(22) Filed: Dec. 1, 2021

(65) Prior Publication Data

US 2022/0171245 A1 Jun. 2, 2022

Related U.S. Application Data

(60) Provisional application No. 63/120,291, filed on Dec. 2, 2020.

(51) Int. Cl.
*G02F 1/1503* (2019.01)
*C09K 9/02* (2006.01)

(52) U.S. Cl.
CPC ............. *C09K 9/02* (2013.01); *G02F 1/1503* (2019.01)

(58) Field of Classification Search
CPC .................................................... G02F 1/1503
See application file for complete search history.

(56) References Cited

U.S. PATENT DOCUMENTS

| | | | |
|---|---|---|---|
| 2011/0080629 A1* | 4/2011 | Neuman | G02F 1/155 359/265 |
| 2017/0373349 A1* | 12/2017 | Braeunling | H01M 10/0569 |
| 2019/0004387 A1* | 1/2019 | Ash | G02F 1/161 |
| 2020/0373623 A1* | 11/2020 | Kinoshita | H01M 10/0568 |
| 2022/0100045 A1* | 3/2022 | Fukushi | C09K 9/00 |

OTHER PUBLICATIONS

Christopher L. Campion, Wentao Li, and Brett L. Lucht, Thermal Decomposition of LiPF6-Based Electrolytes for Lithium Ion Batteries, Journal of the Electrochemical Society, 152 (12) A2327-A2334(2005), Department of Chemistry, University of Rhode Island, Kingston Island 02881, USA.

* cited by examiner

*Primary Examiner* — Bijan Ahvazi
(74) *Attorney, Agent, or Firm* — Price Heneveld LLP; Brian James Brewer

(57) ABSTRACT

An electro-optic element having enhanced durability by the addition of an additive. The additive may enhance the durability of the electro-optic element by reducing or eliminating the effects of water on species with the electro-optic element, such as the electrolyte. Specifically, the additive may operate to reduce or eliminate the formation and/or accumulation of hydrogen fluoride within the electro-optic element by interaction of the electrolyte with water or alcohol molecules. In some embodiments, the additive may be an organosilicon species, such as (3-cyanopropyl) dimethylfluorosilane.

17 Claims, 1 Drawing Sheet

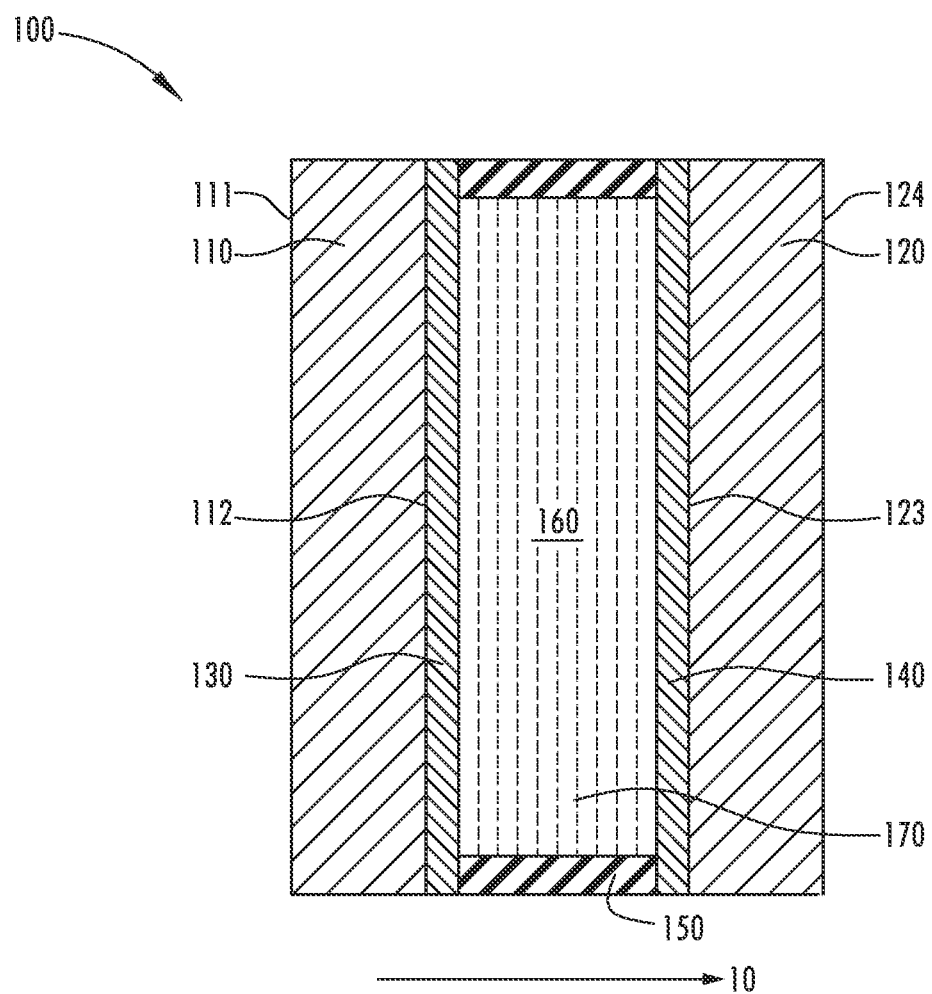

ELECTRO-OPTIC ELEMENT WITH ADDITIVE

CROSS-REFERENCE TO RELATED APPLICATIONS

This application claims priority under 35 U.S.C. § 119(e) to U.S. Provisional Application No. 63/120,291 filed on Dec. 2, 2020, entitled "Electro-Optic Element with Additive" the disclosure of which is hereby incorporated by reference in its entirety.

FIELD OF INVENTION

The present invention relates, in general, to electro-optic elements and, more particularly, to electro-optic elements having an electrolyte additive for improved element durability.

BACKGROUND OF INVENTION

Electro-optic elements have been well known for many years and are increasing in popularity. However, these electro-optic elements may be subject to undesirable degradation. A significant contributor to device degradation may be the introduction of water molecules and/or other impurities into the electro-optic element chamber. Depending on how the electro-optic element is processed, water molecules and other impurities may be introduced into the electro-optic element chamber from the atmosphere. For example, they may be introduced via humidity in the air. This can be particularly problematic in large electro-optic elements, such as those used for windows and sunroofs, for as the size of the electro-optic element increases, preventing water molecules from being introduced into the element becomes increasingly difficult. Moreover, when these large electro-optic elements are implemented as windows and sunroofs, they are often exposed to increased levels of moisture, exacerbating the problem. Accordingly, there is a need for an electro-optic element with enhanced durability, particularly in environments with high moisture levels.

SUMMARY

In accordance with the present disclosure, the disadvantages and problems associated with electro-optic elements of the past have been substantially reduced or eliminated.

In accordance with one aspect of the present disclosure, a device is disclosed. The device may comprise a first substrate, a second substrate, a first electrode, a second electrode, a seal, an electrolyte, an additive, and an electro-optic medium. The first substrate may have a first surface and a second surface. The second substrate may have a third surface and a fourth surface. Further, the second substrate may be disposed in a spaced apart relationship relative the first substrate. The first electrode may be associated with the second surface. Similarly, the second electrode may be associated with the third surface. The electrolyte species may be disposed between the first and second substrates. In some embodiments, the electrolyte species may comprise a hydrolysable fluoride containing anion. The anion may be tetrafluoroborate or hexafluorophosphate. Likewise, the additive may be disposed between the first and second substrates. The additive may be operable to inhibit at least one of the production and the accumulation of hydrogen fluoride by interaction of the electrolyte with water. In some embodiments, the additive may be an organosilicon species.

In some further embodiments, the organosilicon species may be (3-cyanopropyl) dimethylfluorosilane. The electro-optic medium may also be disposed between the first and second substrates. Further, the electro-optic medium may be operable between substantiallly activated and un-activated states based, at least in part, on exposure to an electrical potential. The operation between the substantially activated and un-activated states may correspond to variable transmissivity of the electro-optic medium and/or the device. Accordingly, the electro-optic medium may be electrochromic.

Some aspects of the present disclosure may have the advantage of enabling a device with superior durability and tolerance to moisture. Additionally, in embodiments where an organic carbonate solvent is used, the device may have the further advantage of improved solvent stability, due to reduced or eliminated formation and/or accumulation of hydrogen fluoride. Furthermore, some embodiments of the device may also have the advantage of increased compatibility with $Li^+$ cations since these cations are most commonly paired with hexafluorophosphate anions, which, without the addition, of the additive are particularly susceptible to the formation of hydrogen fluoride.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 1: Cross-sectional schematic representation of an electro-optic element.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not to be construed as limiting, unless the claims expressly state otherwise.

The present disclosure is directed to an electro-optic element having an additive operable to enhance durability of the electro-optic element. Specifically, the durability may be enhanced by reducing or eliminating the effects of water on species within the electro-optic element, such as the electrolyte. Electro-optic elements generally comprise an electrolyte salt dissolved in a solvent. Common electrolyte species include hydrolysable fluoride containing anions. Exemplary fluoride ion forming anions include tetrafluoroborate ($BF_4^-$) and hexafluorophosphate ($PF_6^-$). However, at elevated temperatures, these anion species may react with water or alcohol molecules to form hydrogen fluoride (HF) and/or fluoride ions ($F^-$). The hydrogen fluoride and/or fluoride ions may in turn degrade the electro-optic element. This may be particularly problematic in aprotic solvents like organic carbonates. For example, the hydrogen fluoride molecules and/or fluoride ions may react with an electrode or substrate of the electro-optic element, causing the electrode and/or substrate to degrade and pit. Furthermore, when the electro-optic element is an electrochromic element, the hydrogen fluoride and/or fluoride ions may decompose the electrochromic molecules and/or films. To reduce or eliminate these effects, the additive may interfere with the production and/or accumulation of hydrogen fluoride and/or fluoride ions.

FIG. 1 illustrates a cross-sectional schematic of an embodiment of an electro-optic element 100. Electro-optic element 100 may comprise a first substrate 110, a second substrate 120, a first electrode 130, a second electrode 140, a seal 150, a chamber 160, a chamber material 170, and/or an electro-optic medium. Further, electro-optic element 100 may be operable between a substantially activated state and a substantially un-activated state. Operation between such states may correspond to a variable transmissivity of electro-optic element 100. Electro-optic element 100, for example, may be a window, a sunroof, a rearview mirror assembly, a light filter, or a sensor concealment device.

First substrate 110 may be substantially transparent in the visible and/or infrared regions of the electromagnetic spectrum. Further, first substrate 110 may have a first surface 111 and a second surface 112. First surface 111 and second surface 112 may be disposed opposite one another with second surface 112 disposed in a first direction 10 relative first surface 110. The first direction may be defined as substantially orthogonal first surface 111. Additionally, first substrate 110, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Similarly, second substrate 120 may have a third surface 123 and a fourth surface 124. Third surface 123 and fourth surface 124 may be disposed opposite one another with fourth surface 124 disposed in first direction 10 relative third surface 123. Additionally, second substrate 120 may be disposed in first direction 10 in a spaced apart relationship relative first substate 110. Thus, third surface 123 may face second surface 112. In some embodiments, second substrate 120 may be substantially transparent in the visible and/or infrared regions. Accordingly, second substrate 120 may be comprised of the same or similar materials suitable for first substate 110. In other embodiments, such as for a rearview mirror assembly, substantial transparency is not necessary. In such an embodiment, second substrate 120 may also be selected from substantially opaque and/or reflective materials.

First electrode 130 is an electrically conductive material. Further, first electrode 130 may be associated with second surface 112. Accordingly, first electrode 130 may be disposed on second surface 112. The electrically conductive material of first electrode 130 may be substantially transparent in the visible and/or infrared regions of the electromagnetic spectrum, bond reasonably well to first substrate 110, and/or be generally resistant to corrosion from materials of chamber material 170. For example, the electrically conductive material may be fabricated from a transparent conductive oxide (TCO), such as fluorine doped tin oxide (FTO), tin doped indium oxide (ITO), doped zinc oxide, indium zinc oxide, or other materials known in the art.

Second electrode 140 is, likewise, an electrically conductive material. Further, second electrode 140 is associated with third surface 123. Accordingly, second electrode 140 may be disposed on third surface 132. The electrically conductive material may be fabricated from the same or similar materials as first electrode 130. Accordingly, in some embodiments, second electrode 140 may be substantially transparent in the visible and/or infrared regions. In other embodiments, substantial transparency is not necessary. In such an embodiment, second electrode 140 may be selected from substantially opaque and/or reflective materials.

Seal 150 may be disposed in a peripheral manner to, at least in part, define a chamber 160. Chamber 160 is disposed between first substrate 110 and second substrate 120. Accordingly, chamber 160 may be defined by seal 150 in conjunction with at least two of: first substrate 110, second substrate 120, first electrode 130, and second electrode 140. In some embodiments, chamber 160 may, more specifically, be defined by seal 150, first electrode 130, and second electrode 140. Seal 150 may comprise any material capable of being bonded to the at least two of: first substrate 110, second substrate 120, first electrode 130, and second electrode 140, to in turn inhibit oxygen and/or moisture from entering chamber 160, as well as inhibit chamber material 170 from inadvertently leaking out. Seal 150, for example, may include epoxies, urethanes, cyanoacrylates, acrylics, polyimides, polyamides, polysulfides, phenoxy resin, polyolefins, and silicones.

Chamber material 170 may be disposed in chamber 160. Accordingly, chamber material 170 may be disposed between the first and second electrodes 130, 140. In some embodiments, chamber material 170 may be a solution. Further, chamber material 170 may comprise one or more electrolyte species. In some embodiments, the electrolyte species may be a salt dissolved in a solvent. The solvent may be a single species or a mixture of species. Accordingly, chamber material 170 may further comprise a solvent. The salt, for example, may be a metal or ammonium salt, such as $Li^+$, $Na^+$, $K^+$, $NR_4^+$ (where each R is individually H, alkyl, or cycloalkyl) cations with one or more $BF_4^-$, $PF_6^-$, $SbF_6^-$, $AsF_6^-$, $ClO_4^-$, $N(SO_2CF_3)_2^-$, $SO_3CF_3^-$, $Al(OC(CF_3)_3)_4^-$, or $BAr_4^-$ anions, where Ar is a fluorinated aryl group such as, but not limited to, $C_6H_5$, 3,5-$(CF_3)_2C_6H_3$, or $C_6F_5$. The solvent may be operable to dissolve the electrolyte species and/or the electro-optic medium. Examples of solvents: 3-methylsulfolane, dimethyl sulfoxide, dimethyl formamide, tetraglyme, and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures thereof. Accordingly, the solvent may be an organic carbonate.

Additionally, chamber material 170 may further comprise an additive. Accordingly, the additive may be disposed in chamber 160. Thus, the additive may be disposed between the first and second electrodes 130, 140. The additive may be operable to enhance the durability of electro-optic element 100. Further, the additive may interfere with and/or inhibit the electrolyte's production of hydrogen fluoride and/or fluoride ions when exposed to water or alcohol and/or consume hydrogen fluoride and/or fluoride ions. In some embodiments, the additive may also serve as one of the solvent species for the electrolyte species. In some embodiments, the additive may be an organosilicon species. An exemplary organosilicon species may be (3-cyanopropyl) dimethylfluorosilane.

The electro-optic medium may also be disposed in chamber 160. Accordingly, the electro-optic medium may be disposed between the first and second electrodes 130, 140. In some embodiments, the electro-optic medium may be disposed in one or more layers associated with the first and/or second electrodes 130, 140. In other embodiments, the electro-optic medium may be incorporated into chamber material 170. Accordingly, in some embodiments, the electro-optic medium may be dissolved in the solvent. This, the electro-optic medium may be solution phase. Further, the electro-optic medium may contain one or more electro-active materials and/or compounds. Electro-active may mean species of the medium may undergo a modification of its oxidation state upon exposure to a particular electrical potential difference. Accordingly, the electro-optic medium is operable between activated and un-activated states based, at least in part, on exposure to a particular electrical potential. Further, the electro-optic medium may include electro-active anodic and cathodic materials. In some embodiments, activated and un-activated states of the anodic and/or cathodic species may correspond to states having varying degrees of transmissivity. The activated and un-activated states of the anodic and/or cathodic species may further correspond the activated and un-activated states of the electro-optic medium. Accordingly, in some embodiments, the anodic and/or cathodic species and the electro-optic medium may be electrochromic. Electrochromic may mean a component that exhibits a change in its extinction coefficient at one or more wavelengths of the electromagnetic spectrum upon exposure to a particular electrical potential. Accordingly, upon application of a particular electric voltage or potential, a cathodic and/or anodic component may be activated, producing a change in absorbance at one or more wavelengths of the electromagnetic spectrum. The change in absorbance may be in the visible, ultra-violet, infra-red, and/or near infra-red regions. The electro-optic medium may be fabricated from any one of a number of materials, including, for example, those disclosed in U.S. Pat. No. 6,433,914, entitled "Color-Stabilized Electrochromic Devices," which is herein incorporated by reference in its entirety.

Additionally, in some embodiments, one or more electro-active material of the electro-optic medium may serve as a component of the electrolyte species. Specifically, an electro-active and/or electro-optic material may serve as a salt cation for the electrolyte species. Accordingly, further examples of salt cations may include a viologen or ferrocenium. Thus, in some such embodiments, the additive may also serve as one of the solvent species for the electro-active material.

In operation, an electrical potential may be applied across the first and second electrodes 130, 140. Accordingly, the electro-optic medium may operate between the un-activated state and the activated state. Additionally, either though application of the electrical potential or exposure to environmental conditions, electro-optic element 100 may reach elevated temperatures. However, at these elevated temperatures, the additive may operate to reduce or eliminate the formation and/or accumulation of hydrogen fluoride and/or fluoride ions by interaction between water or alcohol and the electrolyte species. Accordingly, certain embodiments of the present disclosure may have the advantage of enabling an electro-optic element 100 with superior durability and tolerance to moisture. Additionally, in embodiments where the solvent is an organic carbonate, electro-optic element 100 may have the further advantage of improved solvent stability, due to the reduced or eliminated formation and/or accumulation of hydrogen fluoride and/or fluoride ions. Furthermore, some embodiments of electro-optic element 100 may also have the advantage of increased compatibility with $Li^+$ cations since they are most commonly paired with hexafluorophosphate anions, which, without the addition of the additive are particularly susceptible to the formation of hydrogen fluoride and/or fluoride ions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A device comprising:
   a first substrate having a first surface and a second surface;
   a second substrate having a third surface and a fourth surface, the second substrate disposed in a spaced apart relationship relative the first substrate;
   a first electrode associated with the second surface;
   a second electrode associated with the third surface;
   an electrolyte species disposed between the first and second electrodes;
   an additive formed of (3-cyanopropyl) dimethylfluorosilane disposed between the first and second electrodes, the additive inhibiting at least one of the production and the accumulation of hydrogen fluoride or fluoride ions by interaction of the electrolyte with water; and
   an electro-optic medium disposed between the first and second electrodes, the electro-optic medium operable between substantially activated and substantially unactivated states corresponding to variable transmissivity based, at least in part, on exposure to an electrical potential.

2. The device according to claim 1, wherein the electrolyte species comprises a hydrolyzed fluoride containing anion.

3. The device according to claim 2, wherein the anion is tetrafluoroborate.

4. The device according to claim 2, wherein the anion is hexafluorophosphate.

5. The device according to claim 1, wherein the electro-optic medium is electrochromic.

6. The device according to claim 1, wherein the electro-optic medium is disposed in one or more layers associated with the at least one of the first and second electrodes.

7. The device according to claim 1, wherein the electro-optic medium is in solution.

8. The device according to claim 7, wherein the additive is a solvent of the electro-optic medium.

9. The device according to claim 1, wherein one or more component of the electro-optic medium is also a component of the electrolyte species.

10. The device according to claim 1, wherein the additive is a solvent of the electrolyte species.

11. A sunroof comprising the device of claim 1.

12. A rearview mirror assembly comprising the device of claim 1.

13. A window comprising the device of claim 1.

14. An electro-optic element comprising:
    a first substrate being substantially transparent and having a first surface and a second surface;
    a second substrate being substantially transparent and having a third surface and a fourth surface, the second substrate disposed in a spaced apart relationship relative the first substrate;
    a first electrode associated with the second surface;
    a second electrode associated with the third surface;
    an electrolyte species disposed between the first and second electrodes;
    an additive formed of (3-cyanopropyl) dimethylfluorosilane disposed between the first and second electrodes, the additive inhibiting at least one of the production and the accumulation of hydrogen fluoride or fluoride ions by interaction of the electrolyte with water; and
    an electro-optic medium disposed between the first and second electrodes, the electro-optic medium having variable transmissivity based, at least in part, on exposure to an electrical potential.

15. A sunroof comprising the electro-optic element of claim 14.

16. An electro-optic element comprising:
    a first substrate being substantially transparent and having a first surface and a second surface;
    a second substrate being substantially reflective and having a third surface and a fourth surface, the second substrate disposed in a spaced apart relationship relative the first substrate;
    a first electrode associated with the second surface;
    a second electrode associated with the third surface;
    an electrolyte species disposed between the first and second electrodes;
    an additive formed of (3-cyanopropyl) dimethylfluorosilane disposed between the first and second electrodes, the additive inhibiting at least one of the production and the accumulation of hydrogen fluoride or fluoride ions by interaction of the electrolyte with water; and
    an electro-optic medium disposed between the first and second electrodes, the electro-optic medium having variable transmissivity based, at least in part, on exposure to an electrical potential.

17. A rearview mirror assembly comprising the electro-optic element of claim 16.

* * * * *